United States Patent [19]

Circello et al.

[11] Patent Number: 4,602,368
[45] Date of Patent: Jul. 22, 1986

[54] DUAL VALIDITY BIT ARRAYS

[75] Inventors: Joseph C. Circello, Phoenix; John E. Wilhite, Glendale; William A. Shelly; Morgan S. Riley, both of Phoenix, all of Ariz.

[73] Assignee: Honeywell Information Systems Inc., Phoenix, Ariz.

[21] Appl. No.: 485,551

[22] Filed: Apr. 15, 1983

[51] Int. Cl.[4] .............................................. G06F 9/00
[52] U.S. Cl. ..................................... 371/21; 371/67; 364/900
[58] Field of Search ... 364/200 MS File, 900 MS File; 371/21, 67

[56] References Cited

U.S. PATENT DOCUMENTS

| | | | |
|---|---|---|---|
| 4,145,738 | 3/1979 | Inoue et al. | 364/200 |
| 4,170,039 | 10/1979 | Beacom et al. | 364/200 |
| 4,241,401 | 12/1980 | De Wierd et al. | 364/200 |
| 4,326,248 | 4/1982 | Hinai et al. | 364/200 |
| 4,374,410 | 2/1983 | Sakai et al. | 364/200 |

Primary Examiner—Gareth D. Shaw
Assistant Examiner—John G. Mills
Attorney, Agent, or Firm—A. A. Sapelli; J. S. Solakian; A. Medved

[57] ABSTRACT

An associative memory used to translate a virtual page number (VPN) of a virtual word address to a physical page number (PPN) of a physical word address of a random access memory of a digital computer system is provided with a pair of independently addressable validity bit arrays, each of which arrays can store a validity bit in each of the addressable locations of each array. A pointer enables only one of the validity bit arrays to receive address signals corresponding to the lower virtual page number (LVPN) of a VPN. The validity bit read out of the memory location corresponding to the LVPN of the enabled array is used in determining if the PPN read out of the corresponding memory location of the associative memory is valid. The bits of the disabled array, immediately after it is disabled, are all reset, or cleared. After all validity bits of the disabled array are reset, a clear associative memory paging (CAMP) instruction can be executed to invalidate all entries written into the associative memory by enabling the cleared disabled array and disabling the array enabled at the time such a CAMP instruction begins execution.

11 Claims, 5 Drawing Figures

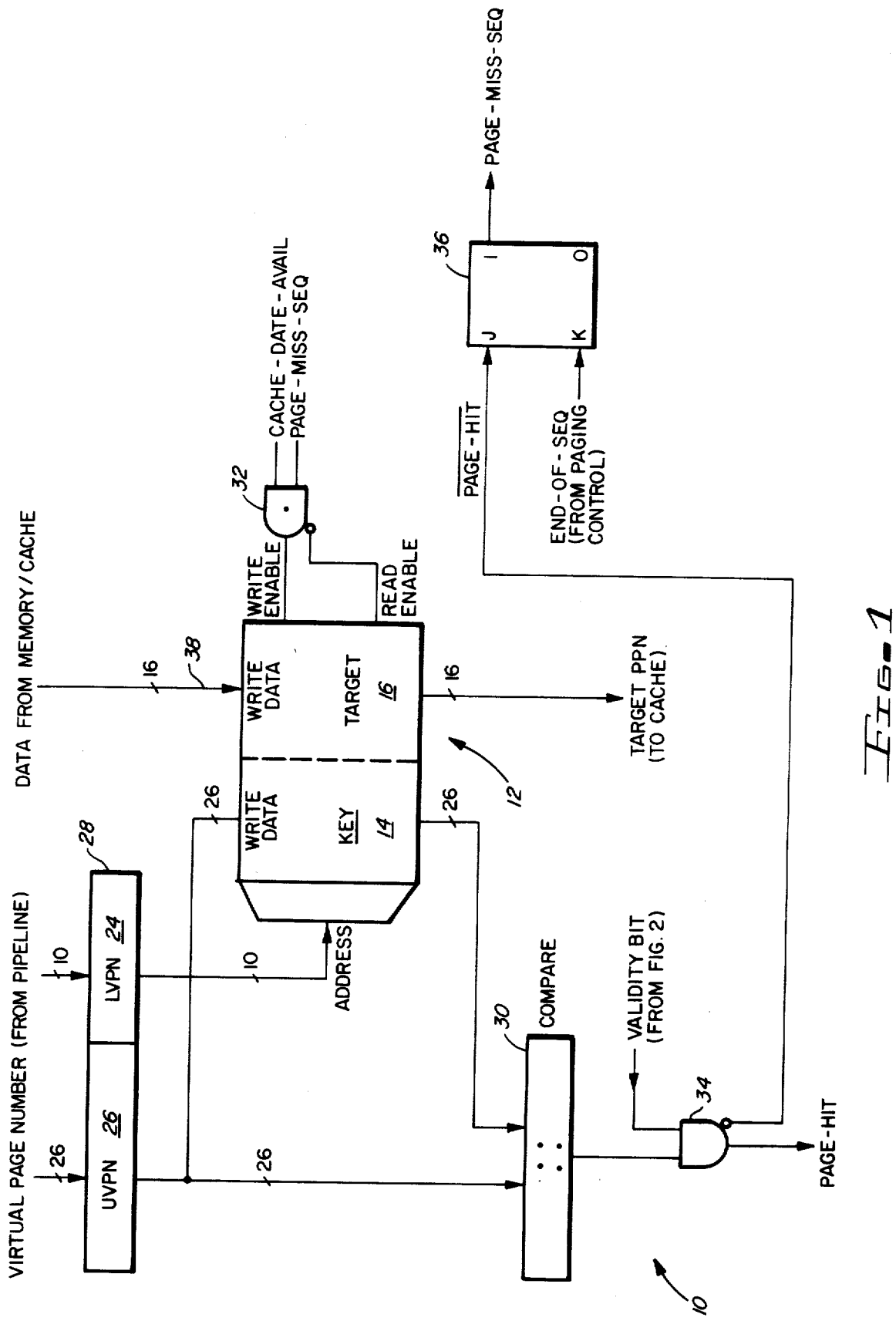

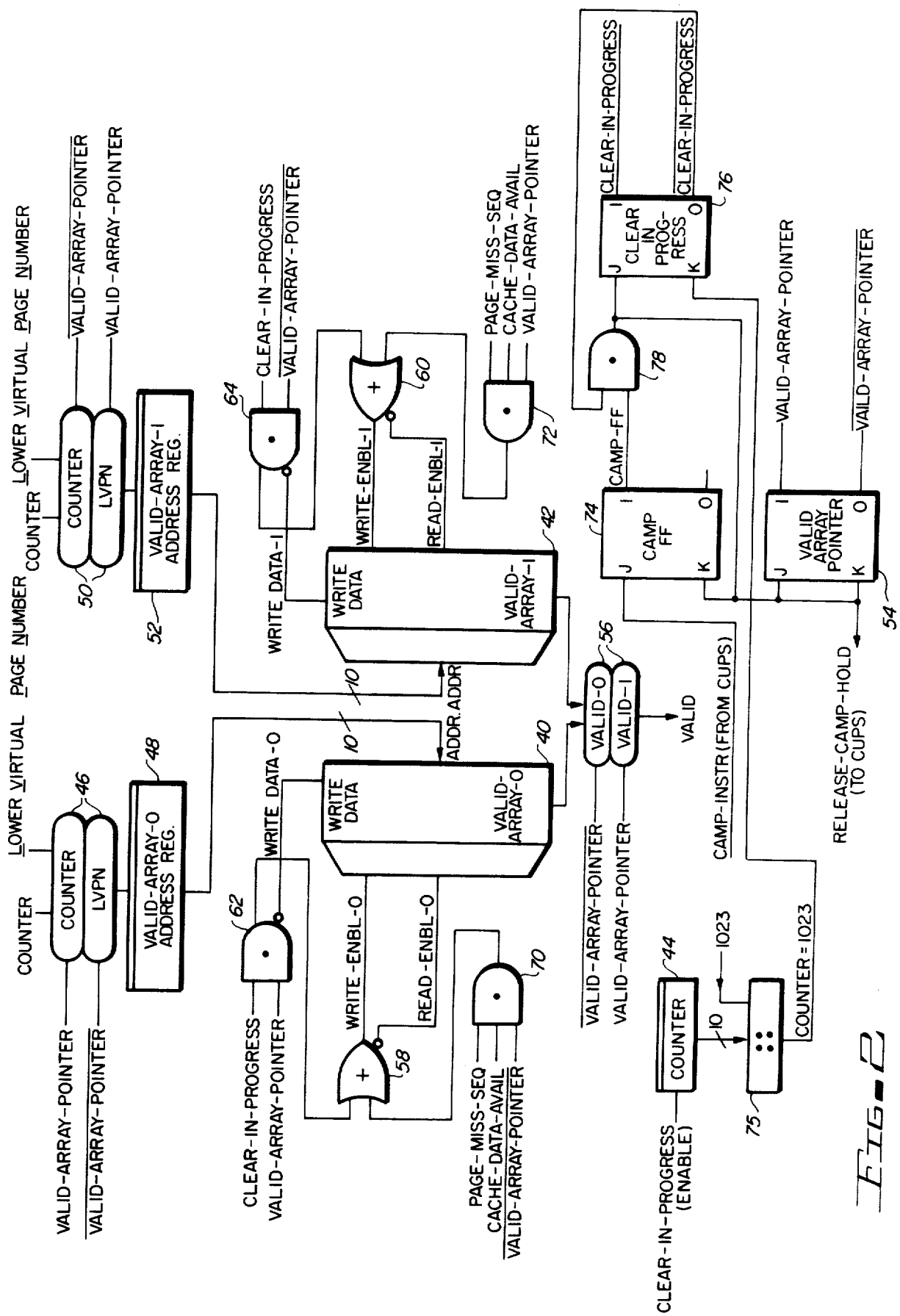

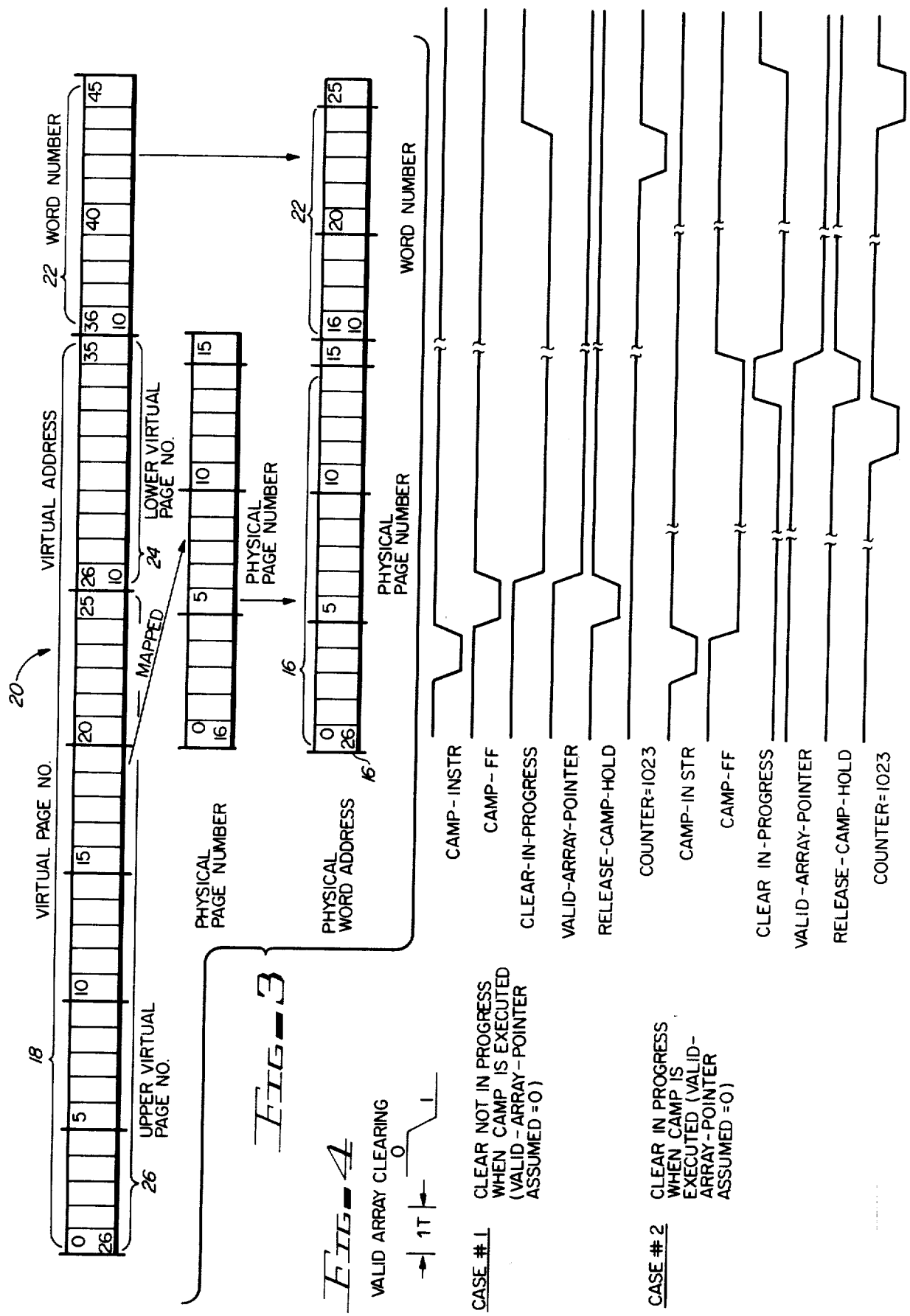

PAGING VALID ARRAY CLEAR

WRITE-ENABLE-0 = PAGE-MISS-SEQ & CACHE-DATA-AVAIL & $\overline{\text{VALID-ARRAY-POINTER}}$
+ CLEAR-IN-PROGRESS & VALID-ARRAY-POINTER READ-ENABLE-0 = $\overline{\text{WRITE-ENABLE-0}}$ WRITE-ENABLE-1 = PAGE-MISS-SEQ & CACHE-DATA-AVAIL & VALID-ARRAY-POINTER
+ CLEAR-IN-PROGRESS & $\overline{\text{VALID-ARRAY-POINTER}}$ READ-ENABLE-1 = $\overline{\text{WRITE-ENABLE-1}}$ WRITE-DATA-0 = $\overline{\text{(CLEAR-IN-PROGRESS & VALID-ARRAY-POINTER)}}$ WRITE-DATA-1 = $\overline{\text{(CLEAR-IN-PROGRESS & }\overline{\text{VALID-ARRAY-POINTER}}\text{)}}$ CAMP FF (SET) = CAMP-INSTR & CLOCK
CAMP FF (RESET) = CAMP FF & $\overline{\text{CLEAR-IN-PROGRESS}}$ & CLOCK CLEAR-IN-PROGRESS (SET) = CAMP FF & $\overline{\text{CLEAR-IN-PROGRESS}}$ & CLOCK
CLEAR-IN-PROGRESS (RESET) = (COUNTER = 1023) & CLOCK VALID-ARRAY-POINTER (SET) = CAMP FF & $\overline{\text{CLEAR-IN-PROGRESS}}$ & $\overline{\text{VALID-ARRAY-POINTER}}$ & CLOCK VALID-ARRAY-POINTER (RESET) = CAMP FF & $\overline{\text{CLEAR-IN-PROGRESS}}$ & VALID-ARRAY-POINTER & CLOCK

FIG. 5

DUAL VALIDITY BIT ARRAYS

BACKGROUND OF THE INVENTION

1. Field of the Invention

This invention is in the field of associative memory apparatus for rapidly translating a virtual page number of a virtual address to a physical page number of an address in a memory of a general-purpose data processing system. More particularly, the associative memory apparatus includes a pair of independently addressable validity bit arrays so that the associative memory can be quickly cleared.

2. Description of the Prior Art

Typically, in large-scale, general-purpose digital data processing systems, the central processor of such a system includes circuits for producing the addresses of instruction words in the memory of the system, for fetching instructions from memory, for preparing addresses of operands, for fetching operands from memory, for loading data into designated registers, for executing instructions, and, when the results are produced, for writing results into memory or into program-visible registers.

To increase the performance of processors and of the data processing systems of which the processors are a part, or their throughput, various modifications have been incorporated into the central processing units. To reduce the time required to obtain operands and instructions, high-speed caches located in the processor have been provided. To further speed up the systems, the systems are synchronized; i.e., a clock produces clock pulses which control each step of the operation of the central processing unit. In pipelined processors, the steps of preparing and fetching instructions or operands are overlapped to increase the system's performance.

Large-scale data processing systems frequently use a virtual memory in which the size of the virtual memory is generally so large as to impose essentially no restrictions on programmers as to the size of their programs. The size of the virtual memory, which can be equated to the number of bits defining a virtual address, is also generally much larger than the size of the physical, or actual memory of the data processing system.

Any data processing system having a virtual memory capability must have a way to translate, or map, a virtual address of a data word to its physical address. A physical address is the address in the system memory, or physical memory, of that data word. This can be accomplished by table look-up techniques, but the use of tables generally requires several clock periods, and, if the actual steps of mapping each virtual address to its corresponding physical address were required for every address that is prepared by a processor, this requirement would significantly reduce the performance, or throughput, of such a system.

To speed up the process of mapping virtual addresses to physical addresses, a paging buffer, an associative memory, may be incorporated into the processors of such systems to transform, or map, a virtual page address or number to a physical page address or number. Each successful transformation, or mapping, using a paging buffer requires only one clock period, for example. Thus, once a target physical page address of a given virtual address is determined, the target physical page number is stored or written into the paging buffer. Once this has been accomplished, the mapping of the virtual address of a given data word to its physical address can be accomplished within one clock period. A consequence of such fast mapping is that the central pipeline unit of the processor will not be broken; i.e., halted for one or more clock periods while the mapping function is performed by the paging logic of the central processor unit.

Virtual addresses (VA) can be considered as being divided into two portions, a virtual page number (VPN) and a word number. A word number is defined as the location of a data word in a page. Typically, a word number, or word address, is the lower order ten bits of a virtual address when addressing to the word level with some, or all, of the bits of higher order than the word number of a virtual address being a virtual page number (VPN). In the system in which this invention is incorporated, a VPN is a 36-bit binary number and a physical page number (PPN) is a 16-bit binary number. The 16 bits of a PPN and the ten bits of a word number constitute a physical address to the word level of a data word. A physical address is an actual address in the system memory or of a cache into which a data word corresponding to the virtual address can be written or from which it can be read. A data word can be an operand or an instruction. Typically, a data word is made up of four bytes of either 8 or 9 bits per byte. If there is a need to address to the byte or bit level, an additional 2 or 6 bits are appended to the virtual and physical word addresses to identify a byte or a bit of that data word. Such byte and bit address bits, if present, will be the least significant bits of the address.

Prior art virtual to physical address translation has been accomplished by a directly mapped associative memory which contains up to a given maximum number of the most recently used translations, or mappings, of virtual addresses to physical addresses. The paging buffer will, of course, have a given number of entries, or addresses, one for each addressable storage location of the associative memory. The data stored at each addressable memory location consists of three fields: a key field that provides the necessary association with a given VPN; a target PPN, the desired virtual to physical mapping of the given VPN; and a validity bit which denotes the presence or absence of valid information in the key and target fields of the addressed location of the associative memory. A virtual page number of a virtual address can be considered as including a lower portion, or the lower virtual page number (LVPN). The LVPN is the lower order 10 bits of a virtual page number in the preferred embodiment. The higher order bits of a VPN are the upper virtual page number (UVPN). In the preferred embodiment, the UVPN is the higher order 26 bits of a VPN. The bits of the LVPN are used as the entry to, or the address signals applied, to the address logic of a RAM chip, or chips, that comprise a paging buffer associative memory. The outputs of the associative memory include the key field, the target PPN field, and the validity bit. The key field read out of memory is compared with the bits of the UVPN of the VPN to be mapped. If they match and the validity bit is set indicating that the data stored at the addressed location is valid, or correct, then the target PPN is the proper translation of the VPN, or the target PPN is the physical page number of a physical address which can be used to fetch a data word or to write a data word into the corresponding addressable location of a memory device of the system.

There can occur situations when it is desirable to clear immediately all the entries of a paging buffer, such as when significant changes are made in the contents of the tables used to produce translations from virtual page numbers to physical page numbers. With prior art paging buffers, it was necessary to reset all the validity bits thereof to clear a paging buffer. Each addressable memory location of the paging buffer is addressed and the validity bit stored at each addressable location is reset. If there were $2^{10}$ addressable locations, for example, it would require $2^{10}$ clock periods to completely clear the buffer memory, assuming that it takes only one clock period to reset the validity bit at each addressable location of the paging buffer associative memory.

SUMMARY OF THE INVENTION

The present invention provides a central processor of a data processing system with an improved associative memory paging buffer for translating a virtual page number (VPN) of a virtual address (VA) to a physical page number (PPN). The VPN is divided into an upper virtual page number (UVPN) and a lower virtual page number (LVPN). The LVPN is used as an index, or address, of a memory location of the buffer in which is stored a key field corresponding to the UVPN and a target field for storing the target physical page number PPN of the VA. The buffer is also provided with at least two independently addressable validity bit arrays. Only one of the arrays is enabled at any given time to receive a LVPN of a given VPN as an address and to either write a validity bit into the addressed location during a write cycle of the enabled array or to read out the validity bit stored at the addressed location during a read cycle of the enabled validity bit array. Similarly, during a write cycle the UVPN of a given VA will be written into the key field of the addressed location of the buffer and the PPN as determined by the paging logic will be written into the target field of that location. During a read cycle, the key and target fields stored at the addressed location are read out of the buffer. The validity bit in the enabled array is set to represent that the target PPN in the correspondingly addressed location in the buffer is valid and thus usable, and is reset to represent that it is not valid or is not usable.

If the key field of the addressed location of the buffer read out of the paging buffer memory during a read cycle matches the UVPN of the VPN being translated and the validity bit in the enabled validity bit array is set, a PPN hit signal is produced signifying that the PPN can be used by the addressing mechanism of the central processor in a subsequent read or write operation. During the period a given validity bit array is enabled, the disabled array will have all the validity bits of each of its addressable locations reset to a logical zero, for example. After all the validity bits of the disabled array are reset, a clear associative memory paging (CAMP) instruction is executed by enabling the disabled array and disabling the enabled array. The validity bits of the array so disabled are then all reset off line. After being reset, the central processor is in condition to execute a CAMP instruction upon receipt.

It is, therefore, an object of this invention to provide an associative memory with independently addressable validity bit arrays, only one of which is enabled at any one time, and in which the disabled array is cleared beginning promptly after it is disabled in response to a clear associative memory instruction being executed by a processor of which the associative memory is a part.

It is another object of this invention to provide an associative memory buffer with a pair of independently addressable validity bit arrays, only one of which is enabled at any one time and the other of which is cleared while disabled.

It is yet another object of this invention to provide an associative memory paging buffer for mapping virtual page numbers to physical page numbers, which buffer is provided with a pair of independently addressable validity bit arrays so that a clear associative memory paging instruction can be executed with a minimum of delay.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a schematic block diagram of a paging buffer;

FIG. 2 is a schematic block diagram of a dual validity bit array;

FIG. 3 illustrates the formats of, and defines, the binary signals of, a virtual address, a physical page number, and a physical address;

FIG. 4 illustrates two sets of control signals utilized to control the dual validity bit array; and FIG. 5 is the logic equations for controlling the clearing of the validity bit arrays.

DESCRIPTION OF THE INVENTION

In FIG. 1, paging buffer system 10 is provided with an associative memory 12 in which data stored in each addressable location of memory 12 is divided into a key field, or key, 14 and a target field 15 in which is stored a physical page number (PPN), 16 resulting from the transformation, or mapping, of a virtual page number (VPN) 18 to a PPN 16 by conventional paging logic of a central processing unit (CPU) of which the system 10 is a part. Formats of a virtual address 20 (VA), a VPN 18 and a PPN 16 are illustrated in FIG. 3. In the preferred embodiment, a VA of forty-six bits to the word level is defined as consisting of, or is the concatenation of, a word number 22, the ten lower order bits of VA 20 and a virtual page number (VPN) 18. The higher order thirty-six bits of virtual address 20 define VPN 18 with the ten lower order bits of VPN 18; namely, bits 26–35, defining a lower virtual page number (LVPN) 24, and the higher order twenty-six bits; namely, bits 0–25, defining an upper virtual page number (UVPN) 26.

As soon as the address preparation logic of the central pipeline unit of the central processor of which paging buffer 10 is a component has developed a virtual address of an operand, for example, its UVPN 26 and LVPN 24 are stored in virtual page number register (VPNR) 28. The LVPN 24 is applied to the address logic of memory device 12 and UVPN 26 is applied to comparator 30. If AND gate 32 is producing a read-enable control signal, UVPN 26 and target PPN 16 stored at the addressed location of memory device 12 are read out of that location, the address of which is that of the LVPN 24 stored in register 28 during that read cycle. Key field 14 from memory 12 is applied to comparator 30 and the target PPN 16 from target field 15 is transmitted, in the preferred embodiment, to the cache of the CPU as a portion of the address of an operand to be fetched from the cache or from main memory if the operand is not in the cache, as is well known in the computer art. If the signals of the UVPN 26 compare with the signals of key field 14, comparator 30 produces a compare control signal. And gate 34, to which the compare control signal from comparator 30 is applied and to which is also applied a validity bit from the enabled one of validity bit arrays 40, 42 illustrated in FIG. 2, will produce a page-hit control signal if both these signals are true; i.e., logical ones, for example. The complement of the page-hit control signal from gate 34 page-hit is applied to the J input terminal of J-K flip-flop 36 which produces a page-miss-sequence control signal when the page-hit control signal is true. A page-miss-sequence control signal from F/F 36 causes the paging logic of the CPU to determine the correct PPN 16 for the virtual page number consisting of UVPN 26 and LVPN 24 stored in register 28. When the correct PPN 16 has been determined by the paging logic, a cache-data-available control signal is applied to gate 32, causing gate 32 to produce a write-enable control signal. As a result, the PPN, as determined by the paging logic and which is applied over data-in bus 38 to memory 12, and the UVPN 26 stored in register 28 are written into the memory location of associative memory 12, the address of which is that of lower virtual page number 24 stored in the lower portion of register 28.

In FIGS. 1 and 2, buses are illustrated as straight lines with a diagonal line and a numeral to identify the number of conductors comprising the bus, or the number of binary signals the bus can transmit in parallel. A single line without such a diagonal line and number is a single conductor for transmitting a single bit at a time.

In FIG. 2, validity bit arrays 40, 42 are each capable of storing a validity bit in each of their addressable memory locations. The number of addressable locations of each of the arrays 40, 42 is the same as that of associative paging memory, or buffer, 12. Thus, in the preferred embodiment, since the LVPN 24 is the address applied to the address logic of memory 12 and is, in the preferred embodiment, a ten-bit number, the number of addressable locations in each of the validity bit arrays is $2^{10}=1024=1K$ addressable locations. The source of address signals for arrays 40, 42 is either the LVPN 24 stored in register 28 or the output of counter 44. One of two select switch 46 determines the source of the address signals that are applied to and are stored in address register 48, which signals are then applied to the address logic of validity array-0, 40. Similarly, 1 of 2 select switch 50 determines which of the two sources of address signals are applied to and stored in register 52, which signals are then applied to the address logic of validity array-1, 42.

Which of the two arrays 40, 42 is enabled to any one time is determined by pointer flip-flop 54. Pointer 54 is a J-K F/F that is toggled to change its state each time a release-CAMP-hold control signal is produced by AND gate 78 in response to a CAMP INSTRUCTION control signal being produced by the instruction decoding logic of the central unit pipeline (CUPS) of the CPU.

The outputs of arrays 40, 42 are applied to 1 of 2 select switch 56. Depending on the state of validity pointer 54, a single validity bit stored at the addressed location of the enabled array, when the memory cycle of the array is a read cycle, will be applied to AND gate 34 illustrated in FIG. 1. Validity array-0, 40, is enabled when the valid-array-pointer control signal is a logical one. Validity bit array-1, 42, is enabled when the valid-array-pointer control signal of flip-flop 54 is a logical one. The outputs of pointer 54 also determine the source of the address signals applied to arrays 40, 42. Thus, when array 40 is enabled, the source of address signals applied to array 40 is LVPN 24 from register 28. When array 40 is enabled, array 42 will be disabled and the source of address signals applied to array 42 is counter 44.

The mode of operation of arrays 40, 42 is determined by the outputs of OR gates 58 and 60; i.e., a true, or logical one, output of gate 58, a write-enable-0 control signal, for example, will cause validity array-0, 40, to write the signal applied to it from the complementary output terminal of and gate 62 into the addressed location, and the complementary output of or gate 58 when true a read-enable-0 control signal will correspondingly put array 40 into a read mode so that the data stored at the addressed location will be read out of the addressed location when the read-enable-0 control signal from gate 58 is a logical one. In the preferred embodiment, a logical one is written into the addressed location of the enabled array during a write memory cycle and a logical zero is written into the addressed location of the disabled array during a write memory cycle as determined by the complementary output of AND gates 62, 64. The true outputs of AND gates 62, 64 also provide one input to two input OR gates 58, 60, respectively. Three input AND gate 70 provides the second input to OR gate 58 and three input AND gate 72 the second input to OR gate 60.

In the absence of a CAMP-FF control signal from flip-flop 74 and a clear-in-progress control signal from flip-flop 76 so that the clear-in-progress control signal is a logical one and, if valid array pointer flip-flop 54 is reset so that valid-array-pointer is true, validity bit array-0 40 is enabled; i.e., the lower portion of switch 46 is enabled so that a LVPN from register 28 is stored in array-0 address register 48. The address in register 48 is then applied to the address logic of array 40. The write-data-0 control signal is also true, which results in a logic 1 being written into the addressed location of array 40 during any write cycle. Under these circumstances, a write enable signal would be produced by or gate 58 if the three inputs to and gate 70 are true; i.e., a page-miss had occurred, the paging logic had produced a target PPN which was present on data-in bus 38 of associative array 12 and array 40 is enabled. The write-enable control signal produced by gate 58 would be true causing a one to be written into the corresponding addressed location of array 40. While the paging logic is predicting the correct PPN for a virtual page number, the central unit pipeline is stopped until such time as the PPN is produced and stored in associative memory 12 and a logical 1 is written into the addressed location of the enabled validity bit array, array 40. On a read cycle, the validity bit stored in array 40 at the addressed location thereof is applied to AND gate 34 by the upper position of switch 56 which is enabled by the 0 output of pointer 54 being a logical 1. Similarly, if pointer flip-flop 54 is set, array 42 would function in a similar manner..

While array 40 is enabled, the upper position of switch 50 is enabled by the valid-array-pointer control signal being true, so that the output of counter 44 would be the source of addresses stored in valid array-1 address register 52. The write-data-1 control signal produced by AND gate 64 would be a logical zero, so that only a logical zero would be written into the addressed memory location of disabled array 42 during each write memory cycle. Counter 44, when enabled by the receipt of a clear-in-progress control signal from flip-flop 76, begins counting starting with zero, represented by ten binary zeros in the preferred embodiment. The ten-bit output of counter 44 is applied to comparator 75, as well as to switches 46, 50. The other input to comparator 75 are binary signals representing 1023; namely, ten binary ones. When counter 44 reaches 1023, which it will do after 1023 clock pulses have been produced by the CPU clock after the receipt of a clear-in-progress enable control signal from F/F 76, the counter=1023 control signal is produced by comparator 75. This signal resets flip-flop 76 and enables AND gate 78. After and gate 78 is enabled, AND gate 78 will produce a release-CAMP-hold control signal upon the receipt of a CAMP control signal at the J input of flip-flop 74 toggling pointer, F/F 54.

In FIG. 4, the wave forms of the control signals for paging buffer system 10, particularly those associated with a CAMP instruction, are illustrated. In case 1, the signals illustrate the sequence of such control signals when a clear of the disabled array is not in progress at the time a CAMP-instruction control signal is produced by the CPU. In case 1, pointer flip-flop 54 changes state promptly; i.e., one clock period after CAMP flip-flop 74 is set by the release-CAMP-hold control signal produced by gate 78. Immediately thereafter, the now disabled array 40, disabled as a result of the change of state of flip-flop 54, is cleared by counter 44 cycling through all binary numbers between 0 and 1023. While array 40 is being cleared, the output of OR gate 58 is such that the now disabled array 40 will be in the write mode and a logical zero will be written into each memory location thereof, one per memory cycle. When the counter reaches 1023, the resetting of each memory location of the disabled array is completed. When the count produced by counter 44 reaches 1023, comparator 75 produces a count-compare control signal that resets clear-in-progress flip-flop 76. Resetting flip-flop 76 enables AND gate 78 to produce a release-CAMP-hold control signal if F/F 74 is set or upon the receipt of another CAMP control signal from F/F 74.

If a CAMP control signal is received while flip-flop 76 is set representing that a clear is in progress in one of the validity bit arrays, AND gate 78 is disabled and will remain disabled until clear-in-progress flip-flop 76 is reset, which occurs when the counter=1023 control signal is produced by comparator 75 after all of the memory locations of the disabled array have been reset. Only then is pointer 54 toggled by a release-CAMP-hold control signal to enable the then cleared array, and to disable the array in use. In the event that a CAMP instruction begins execution while a clear-in-progress control signal is being produced by F/F 76, the central unit pipeline structure of the processor will be stopped, or held, until such time as all the addressed locations in the disabled array have been reset which occurs before a release-CAMP-hold control signal is produced by AND gate 78.

In order to completely describe the operation of the preferred embodiment, logic equations defining the relevant control signals for the dual validity bit arrays are set forth in FIG. 5. These logic equations should permit anyone reasonably skilled in the relevant computer arts to practice the invention.

From the foregoing, it is believed clear that by providing an associative paging memory with a plurality of independently addressable validity bit arrays, that the time required to clear the associative paging memory is significantly reduced, in most cases, compared with the prior art methods and apparatus for clearing such a memory.

What is claimed is:

1. Apparatus for producing a first binary number of "n" bits from a second binary number of "m" bits, the lower order "a" bits of the second binary number being an index number and the higher order "b" bits of the second binary number being a key number, comprising:

an associative random access memory having $2^a$ addressable memory locations, said associative memory adapted to store b+n bits at each addressable memory location;

a first independently addressable validity bit array random access memory having $2^a$ addressable memory locations, said first array adapted to store a validity bit at each addressable memory location;

a second independently addressable validity bit array random access memory having a $2^a$ addressable memory locations, said second array adapted to store a validity bit at each addressable memory location;

pointer means for enabling only one of said validity bit arrays to receive address signals of "a" bits at a given time from the binary number m and to produce the validity bit stored at an addressed memory location;

circuit means for applying to the associative memory and to the enabled validity bit array the lower "a" bits of the second number as an address, said associative memory in response thereto and to a read enable signal for producing signals representing the (b+n) bits stored at the addressed location of the associative memory, and the enabled validity bit array in response thereto and to a read enable signal producing a signal representing the validity bit stored at the addressed location of the enabled validity bit array;

circuit means for comparing the signals representing higher order "b" bits of the second number and the "b" bits stored at the addressed location of the associative memory and for producing a signal that the "n" signals representing a first binary number produced by the associative memory is correct if the signals representing the higher order "b" bits of said second number and the "b" bits of the key number compare and the validity bit produced by the enabled validity bit array is set;

means for resetting all the validity bits of all addressable locations stored in the not enabled validity bit array; and means responsive to a CAMP-instruction control signal for causing the pointer to disable the then enabled array and to enable the then disabled array after all validity bits of the not enabled validity bit array have been reset.

2. Apparatus as defined in claim 1 in which the first binary number is a physical page number and in which the second binary number is a virtual page number.

3. Apparatus as defined in claim 2 in which n equals 16, m equals 36, a equals 10, and b equals 26.

4. Apparatus as defined in claim 3 in which the pointer means includes a J-K F/F.

5. Apparatus as defined in claim 3 in which the means for resetting all validity bits of all addressed locations stored in a not enabled validity bit array includes a counter capable of producing the address of each memory location of an array during one cycle of operation when enabled.

6. Apparatus as defined in claim 5 in which the means responsive to a clear-associative-memory control signal is inhibited from enabling the then disabled array while the counter is enabled to produce addreses during one of the counter's cycles of operation.

7. A paging buffer for producing a physical page number of 16 bits derived from a virtual page number of 36 bits, the lower order 10 bits of which are a lower virtual page number and the higher order 26 bits of which are an upper virtual page number, comprising:
- an associative random access memory having $2^{10}$ addressable memory locations, the address of each of which is associated with a lower virtual page number and which associative memory is adapted to store a 26-bit key and a 16-bit target physical page number;
- a first independently addressable validity bit array random access memory having $2^{10}$ addressable memory locations, the address of each location being a lower virtual page number and adapted for storing a validity bit;
- a second independently addressable validity bit array random access memory having a $2^{10}$ addressable memory locations, the address of each location being a lower virtual page number and adapted for storing a validity bit;
- pointer means for enabling one of said validity bit arrays to receive address signals of a lower virtual page number of a given virtual address and for disabling the other array from receiving said address signals;
- circuit means for applying to the directly mapped associative random access memory and to the enabled validity bit array address signals corresponding to the lower virtual page number of said given virtual page number, said associative memory in response thereto and to a read enable signal producing signals representing the key and the target physical page number bits stored at the addressed location of the associative memory and the enabled validity bit array in response thereto and to a read enable signal producing a signal representing the validity bit stored at the addressed location;
- circuit means to which signals representing the upper virtual page number of the virtual page number is applied for comparing the signals representing the upper virtual page number of the virtual page number and the 26 bits of the key stored at the addressed location of the associative memory and for producing a signal representing that the physical page number produced by the paging buffer is correct if the upper virtual page number and the key compare, and the validity bit is set;
- means for clearing the disabled validity bit array by resetting all the validity bits stored in the disabled validity bit array; and
- means responsive to a clear associative memory signal for causing the pointer to disable the enabled array and to enable the disabled array after being cleared.

8. In combination:
- associative memory means having "n" storage locations where "n" is an integer greater than zero, each storage location for storing a key field and a target field, bits of the key field of each storage location being a predetermined set of bits obtained from a virtual address and bits of the target field of each storage location being a physical address where the virtual address from which the set of bits stored in the key field were obtained;
- a first and a second validity bit array, each array having "n" storage locations for storing a validity bit for the key and target fields stored in the associative memory means at the locations having the same address, each validity bit having two values, a first value denoting that the key and target fields stored in the locations having the same address are valid and a second value when either or both are invalid;
- means for enabling one validity bit array and for disabling the others;
- means for applying to the enabled array address signals of "n" bits which signals are also applied to the associative memory means;
- means for writing validity bits into the addressed locations of the enabled bit array and for reading validity bits from the addressed locations of the enabled validity bit array;
- means for writing validity bits of the second value into each memory location of the disabled validity bit array; and
- means responsive to a clear associative memory means instruction for enabling the disabled array and for disabling the enabled array after validity bits of the second value have been written into all memory locations of the disabled array.

9. The combination of claim 8 in which "n" equals $2^{10}$.

10. The combination of claim 9 in which the predetermined set of bits obtained from the virtual address is an upper virtual page number (UVPN).

11. The combination of claim 10 in which the address signals applied to the enabled validity bit array is the lower virtual page number of the virtual address.

* * * * *